H. E. MANNING.
FISH LINE REEL HOLDER.
APPLICATION FILED MAR. 12, 1915.
1,154,123.
Patented Sept. 21, 1915.
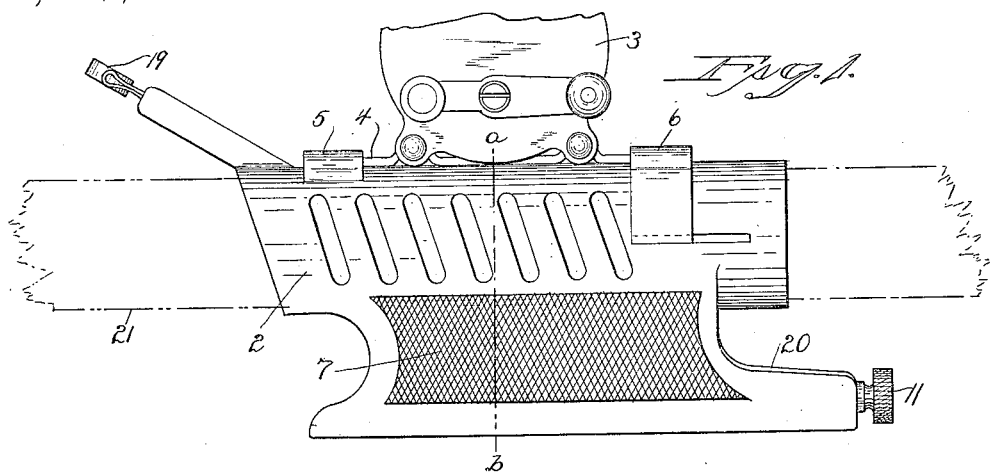
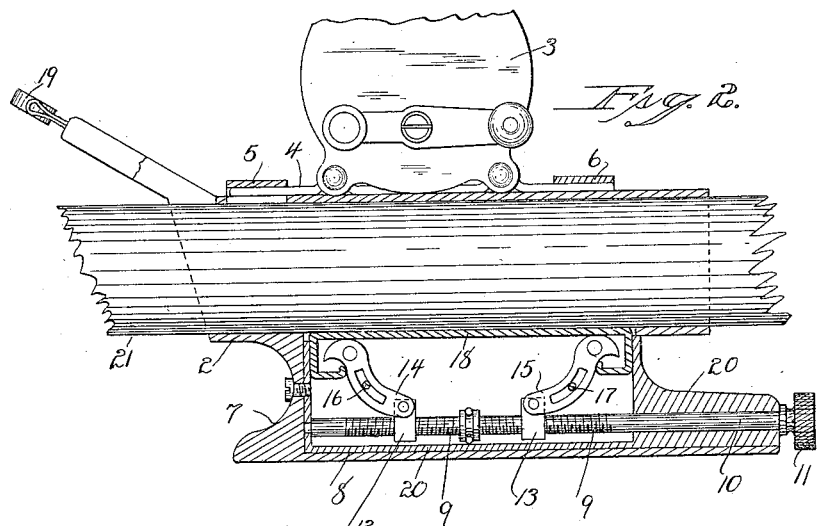
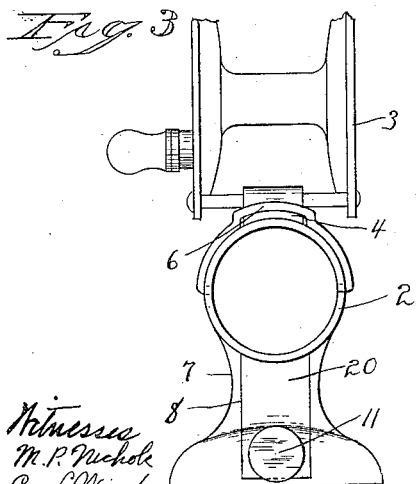
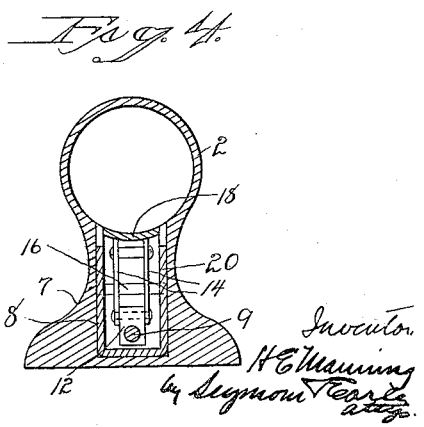

UNITED STATES PATENT OFFICE.

HENRY E. MANNING, OF NEW HAVEN, CONNECTICUT.

FISH-LINE-REEL HOLDER.

1,154,123.　　　　　Specification of Letters Patent.　　Patented Sept. 21, 1915.

Application filed March 12, 1915. Serial No. 13,901.

*To all whom it may concern:*

Be it known that I, HENRY E. MANNING, a citizen of the United States, residing at New Haven, in the county of New Haven and State of Connecticut, have invented a new and useful Improvement in Fish-Line-Reel Holders; and I do hereby declare the following, when taken in connection with the accompanying drawings and the characters of reference marked thereon, to be a full, clear, and exact description of the same, and which said drawings constitute part of this application, and represent, in—

Figure 1 a side view of a fish line reel holder constructed in accordance with my invention. Fig. 2 a side view partially in section of the same. Fig. 3 a rear end view. Fig. 4 a sectional view on the line $a$—$b$ of Fig. 1 with the reel removed.

This invention relates to an improvement in fish line reel holders, the object being to provide a device for holding a reel which may be readily clamped to a fish pole, if desired, or to be used without the pole for drop-line fishing; and the invention consists in the construction hereinafter described and particularly recited in the claims.

In carrying out my invention I employ a tubular portion 2 adapted to support a reel 3 on its upper edge, this reel being provided with the usual base 4 one end of which is inserted under a fixed loop 5 and the other adapted to be held by a sliding loop 6. Below the tubular portion is a handle or grip 7 having a recess 8 which opens into the tubular portion and in this recess a carriage 20 is fixed, and in this carriage is mounted a right and left hand screw 9 the stem 10 of which projects through the rear end of the handle and is provided with a knurled knob 11 which by the screw may be conveniently turned. On this screw are travelers 12, 13, to which are pivotally connected slotted links 14 and 15 which are guided by fixed pins 16 and 17 so that as the screw is turned in one direction or the other the upper ends of the links will be raised or lowered, and resting upon the upper ends of the links is a follower 18 which when forced upward, is adapted to crowd against the pole 21 and so clamp the holder thereto. At the top of the holder and projecting upward and forward therefrom, is a line-guide 19. The reel being fixed to the holder may be used for drop line fishing, the handle providing a convenient holder therefor. The device may be clamped to a pole as indicated in Figs. 1 and 2 of the drawings and adjusted thereon as desired, and firmly clamped thereto.

I claim:—

1. A fish line reel holder comprising a tubular portion, means mounted on said tubular portion for connecting a fish line reel with the upper side thereof, a recessed handle extending below said tubular portion, and locking means mounted in the recess in the handle and extending into the tubular portion.

2. A fish line reel holder comprising a tubular portion, means for connecting the fish line reel with the upper side of said tubular portion, a handle extending below said tubular portion said handle formed with a recess opening into the tubular portion, a right and left hand screw in said recess, links connected with said screw and adapted to be moved thereby, and a follower adapted to be raised and lowered by said links.

In testimony whereof, I have signed this specification in the presence of two subscribing witnesses.

H. E. MANNING.

Witnesses:
　FREDERIC C. EARLE,
　MALCOLM P. NICHOLS.

Copies of this patent may be obtained for five cents each, by addressing the "Commissioner of Patents, Washington, D. C."